United States Patent
Kauhanen

(10) Patent No.: US 7,254,392 B2
(45) Date of Patent: Aug. 7, 2007

(54) INTERSYSTEM HANDOVER WITH MODIFIED PARAMETERS

(75) Inventor: Timo Kauhanen, Kirkkonummi (FI)

(73) Assignee: Nokia Corporation, Espoo (FI)

( * ) Notice: Subject to any disclaimer, the term of this patent is extended or adjusted under 35 U.S.C. 154(b) by 30 days.

(21) Appl. No.: 10/204,959

(22) PCT Filed: Feb. 23, 2001

(86) PCT No.: PCT/EP01/02131

§ 371 (c)(1),
(2), (4) Date: Mar. 11, 2003

(87) PCT Pub. No.: WO01/65881

PCT Pub. Date: Sep. 7, 2001

(65) Prior Publication Data

US 2003/0157935 A1 Aug. 21, 2003

(30) Foreign Application Priority Data

Feb. 28, 2000 (GB) .................. 0004671.4

(51) Int. Cl.
*H04Q 7/00* (2006.01)
(52) U.S. Cl. .................. 455/436; 455/426.1; 455/437; 455/438; 455/439; 455/450; 455/452.1; 455/452.2; 370/331
(58) Field of Classification Search ............ 455/426.1, 455/436–439, 450, 452.1–452.2, 552.1; 370/331–333
See application file for complete search history.

(56) References Cited

U.S. PATENT DOCUMENTS 5,267,261 A * 11/1993 Blakeney et al. .......... 370/332
5,345,448 A * 9/1994 Keskitalo .................... 370/331
6,108,522 A * 8/2000 Blanke ........................ 455/39
6,125,276 A * 9/2000 Lupien ....................... 455/436
6,138,020 A * 10/2000 Galyas et al. ............... 455/436
6,205,128 B1 * 3/2001 Le ............................ 370/331

(Continued)

FOREIGN PATENT DOCUMENTS

DE 19830841 1/2000

(Continued)

OTHER PUBLICATIONS

ETSI: "3rd Generation Partnership Project: Technical Specification Group Services and System Aspects Service Aspects: Handover Requirements Between UMTS and GSM or Other Radio Systems": XP-002143722: ( 3G TS 22.129 version 3.2.0): Dec. 1999), pp. 1-20.

*Primary Examiner*—William Trost
*Assistant Examiner*—Julio Perez
(74) *Attorney, Agent, or Firm*—Squire, Sanders & Dempsey L.L.P.

(57) ABSTRACT

A method for a communication system that includes a first node, a second node and a third node. In the method a connection is established between the first node and the second node based on predefined parameters. Handover of the connection is initiated so that the connection may continue between the first node and the third node. A default value is used for at least one connection parameter required for said connection between the first node and the third node. If it is determined as necessary, the value of said at least one parameter is then modified after the connection has been established.

29 Claims, 3 Drawing Sheets

U.S. PATENT DOCUMENTS 6,400,951 B1 * 6/2002 Vaara .................... 455/436
2002/0107026 A1 * 8/2002 Agrawal et al. ............ 455/453

FOREIGN PATENT DOCUMENTS

| GB | 2.321.161 | 7/1998 |
| WO | WO 96/10305 | 4/1996 |
| WO | WO 99/35872 | 7/1999 |

* cited by examiner

INTERSYSTEM HANDOVER WITH MODIFIED PARAMETERS

FIELD OF THE INVENTION

The present invention relates to handover in a communication system, and in particular, but not exclusively, to handover of a connection from a node to another node, wherein the other node requires at least one parameter for the connection that is not employed by the previous node.

BACKGROUND OF THE INVENTION

Communication networks typically operate in accordance with a given standard or specification which sets out what the various elements of the network are permitted to do and how that should be achieved. For example, the standard may define whether the user or more precisely, user equipment is provided with a circuit switched service or a packet switched service. The standard may also define the communication protocols which shall be used for the connection. The given standard also defines one or more of the required connection parameters. The connection parameters may relate to various features of the connection. The parameters may define features such as the maximum number of traffic channels, quality of service and so on or features that relate to multislot transmission.

In other words, the standard defines the "rules" and parameters on which the communication within the communication system can be based on. Examples of the different standards and/or specifications include, without limiting to these, specifications such as GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access) or CDMA in UMTS (Code Division Multiple Access in Universal Mobile Telecommunications System) and so on.

The user equipment i.e. a terminal that is to be used for communication over a particular communication network has to be implemented in accordance with the predefined "rules" of the network. A terminal may also be arranged to be compatible with more than one standard or specification, i.e. the terminal may communicate in accordance with several different types of communication services. These user equipment are often called as multi-mode terminals, the basic example thereof being a dual-mode mobile station.

A communication network is a cellular radio network consisting of cells. In most cases the cell can be defined as a certain area covered by one or several base transceiver stations (BTS) serving user equipment (UE), such as mobile stations (MS), via a radio interface and possibly connected to a base station subsystem (BSS). Several cells cover a larger area, and form typically a radio coverage area referred to as a location area (LA) or in some standards as a routing area (RA). It should be appreciated that the size of the location area or routing area depends on the system and circumstances, and may equal to one cell or be even smaller, such a part of a coverage area of a base station. A feature of the cellular system is that it provides mobility for the mobile stations, i.e. the mobile stations are enabled to move from a location area to another, and even from a network to another network that is compatible with the standard the mobile station is adapted to.

The user equipment (UE) within one of the cells of the cellular system can be controlled by a node providing controller function. Examples of the controller nodes include a base station controller (BSC), a radio network controller (RNC) and a mobile switching center (MSC), but other control nodes may also be implemented in the network. For example, in the circuit switched GSM (Global System for Mobile) network the controller node is provided by means of a mobile switching center (MSC). In the packet switched UMTS the radio access network thereof is controlled by a radio network controller (RNC). The controller can be connected further to a gateway or linking node, for example a gateway GPRS support node (GGSN) or gateway mobile switching center (GMSC), linking the controller nodes to other parts of the communication system and/or to other communication networks, such as to a PSTN (Public Switched Telecommunications Network) or to a data network, such as to a X.25 based network or to a TCP/IP (Transmission Control Protocol/Internet Protocol) based network. The network may also include nodes for storing information of mobile stations subscribing the networks or visiting the networks, such as appropriate home location registers (HLR) and visitor location registers (VLR).

When user equipment communicates with a communication network, a communication path has been established between the user equipment and an element or node of the network. The network node is typically one of the controller nodes. At least a part of the communication between the user equipment and the actual destination node will then pass through the controller node.

It is possible to transfer i.e. to handover the connection from a first node to a second node. This shall also be possible between two nodes that belong to different network systems. For example, a user equipment having a packet switched (PS) connection with a packet switched network system (e.g. the UMTS) may be handed over to have a circuit switched (CS) connection with a circuit switched network system (e.g. the GSM) and vice versa. The handover of the connection may be required e.g. when the mobile station moves i.e. roams from a cell to another cell. In case the new cell is not served by the same system as the pervious cell, the handover needs to be accomplished between different communication systems.

The inventor has found that in situations where a handover is to be accomplished between the nodes of different communications systems (i.e. systems that are based on different communication rules), it is possible that the "new" connection cannot be properly set-up due to a difference in the parameters required for the connection by the "new" and the "old" i.e. previous communication systems. An example is a handover from a packet switched connection to a circuit switched connection or vice versa. A more detailed example is a handover of a high speed circuit switched data connection between from UMTS (Universal Mobile Telecommunications System) to GSM (Global System for Mobile communications). In the GSM the high speed data is enabled by a multislot mechanism which requires a certain parameter to be exchanged at the call setup. A corresponding mechanism does not exist in the UMTS, and consequently corresponding parameters are not generated or exchanged at the UMTS-call setup. After a UMTS to GSM handover the multislot parameters, however, are required in the GSM portion of the call. Although the mobile stations may provide these parameters, the (dual-mode) UMTS mobile stations may not be obliged to send any GSM-specific parameters every time they se-up a UMTS-call, and therefore the parameters may need to be provided in some other manner at the intersystem handover. In addition, the tight timing requirements of handovers may not allow any exchange of parameters that are not used by the connection before or during the handover procedure.

SUMMARY OF THE INVENTION

It is an aim of the embodiments of the present invention to address one or several of the above problems.

According to one aspect of the present invention, there is provided a method in a communication system that includes a first node, a second node and a third node, comprising the steps of:

establishing a connection between the first node and the second node based on predefined parameters;

initiating handover procedure of the connection so that the connection may continue between the first node and the third node;

using a default value for at least one connection parameter required to establish the connection between the first node and the third node; and modifying, if determined necessary, the value of said at least one parameter.

According to another aspect of the present invention there is provided a communication system comprising:

a first node, a second node and a third node, wherein the first node may communicate with the second node and the third node and a connection between the first node and the second node can be handed over to a connection between the first node and the third node, the set-up of a connection between the first node and the third node being based on at least one parameter that is different from the parameters required for the set-up of the connection between the first node and the second node;

a controller for determining a default value for said at least one different parameter to be used for setting up the connection between the first node and the third node after the handover procedures have been initiated; and means for modifying the value of said at least one parameter.

The embodiments of the invention may provide a handover procedure of a communication connection from a first node to a second node of a communication system even in instances where the second node cannot base the connection on one or more of the connection parameters used by the first node for the connection. The further embodiments may assist in meeting the timing requirements of the handover proceedings even in a handover between nodes that are designed based on different standards and/or specifications.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
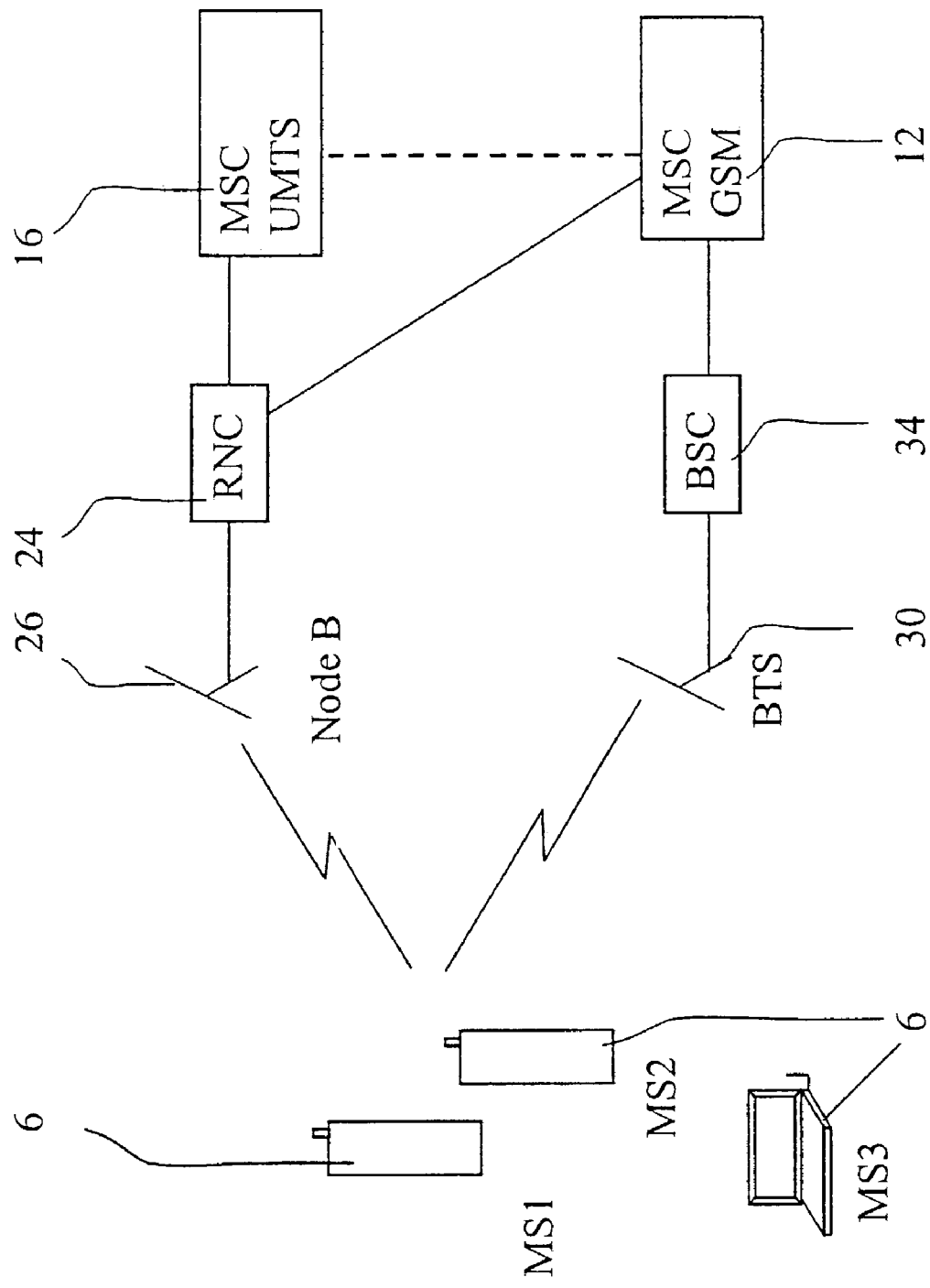
FIG. 1 shows a network arrangement where the embodiments of the present invention may be implemented.

Reference is made to FIG. 1 which is a block diagram illustrating a context in which the present invention may be used. That is, a cellular telecommunication system providing both packet switched service and circuit switched services for user equipment. More particularly, FIG. 1 illustrates a mobile communication system that allows a plurality of mobile stations MS1, MS2, MS3 to communicate with base (transceiver) stations in via respective wireless connections. Each base station has a radio transceiver capable of transmitting radio signals in downlink to the mobile stations within the cell area and receiving radio signals in uplink from the cell area next to the base station. By means of these signals the base station can communicate with the mobile station (MS) in that cell, which itself includes a radio transceiver.

The base stations of the UMTS may be called to as node B, and thus this term is to be used, for clarity reasons, in the following to distinguish them from the GSM base stations BTS. The mobile stations may have a connection either to the base station BTS or to the Node B. It should be appreciated that the functions of the base station BTS and the Node B may also be implemented by means of one entity, i.e. that a base transceiver station may serve both the GSM system and the UMTS system.

Data to be transmitted from and to the user equipment, which comprise mobile stations, may be speech data, video data or other data. Any packet data transmission may be encoded into a form suitable for transmission at a bit rate which is dependent on the application and the source of the data.

A base station BTS 30 or Node B 26 is connected to a controller node of the cellular network. Thus, during a connection, a mobile station (MS) is connected to a controller node via the base station or the Node B. Examples of the controller include a base station controller BSC 34, a radio network controller RNC 24 and mobile switching centers MSC 12 and 16 (GSM and UMTS sides, respectively), the operation of which will be explained in more detail below with reference to FIG. 2. It should be appreciated that other control nodes may also be used for the implementation of the network control function.

The user equipment UE 6 comprise dual-mode mobile stations that may communicate via the BTS of the GSM system and the Node B of the UMTS system. The location of the mobile station 6 could be fixed (for example if it is providing radio communications for a fixed site) or the MS could be moveable (for example if it is a hand portable transceiver or "mobile phone"). When the mobile station is moveable it may move between cells of the cellular radio system. Therefore, as it moves from one cell (the "old cell") to another cell (the "new cell") there is a need to hand it over from communication with the base station and associated network apparatus of the old cell to the base station and associated network apparatus of the new cell without dropping the call. However, it should be appreciated that there may be various other reasons than roaming for the handover, such as overload situations and high priority calls forcing a handover of earlier connections.

The packet data service may be a connectionless service where information symbols are transmitted within data packets. The size and length of the data packets may vary. The information symbols are typically carried by means of packet data bearers. The transmission speed of a bearer is defined by a parameter referred to as bitrate. More particularly, bitrate defines the bit rate that has been allocated for a user of the packet data services. Packet data traffic may include various kinds of data transmission, such as short messages or text only emails and transmission of large documents in the background and-interactive-browsing of the world wide web (WWW).

Figure 2:
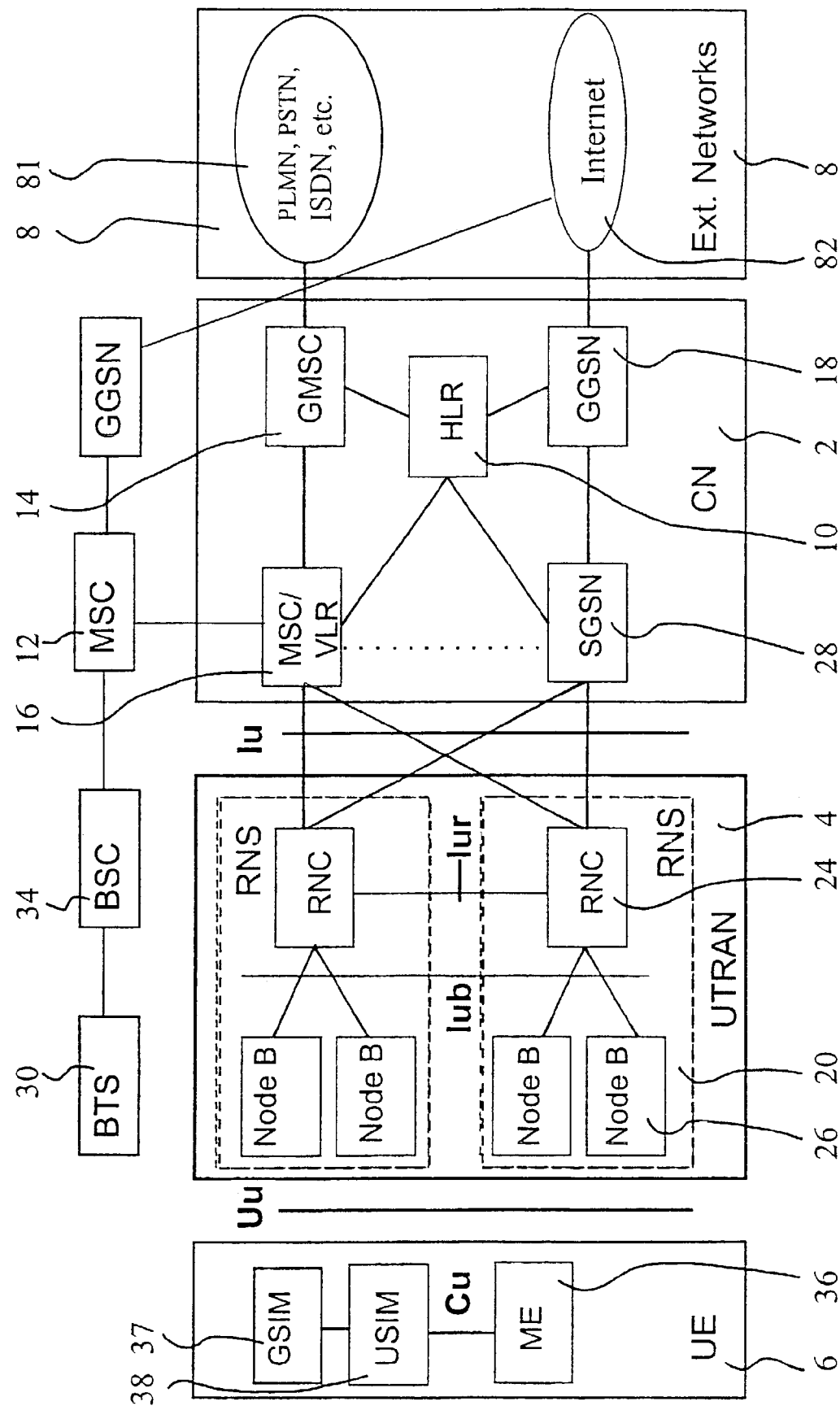
FIG. 2 discloses in more detail a dual-mode network arrangement.

FIG. 2 shows in more detail a mobile telephone system structure enabling packet switched PS and circuit switched CS traffic. The main parts of the illustrated mobile telephone system are: a UMTS core network CN 2, a UMTS terrestrial radio access network UTRAN 4, a GSM network, and user equipment UE 6. The core network CN 2 and/or the GSM network can be connected to external networks 8, which can be either Circuit Switched CS networks 81 (e.g. public land mobile network PLMN, public circuit switched network PSTN, integrated services digital network ISDN) or Packet Switched PS networks 82 (e.g. the TCP/IP protocol Internet). The interface between the core network CN 2 and the UMTS terrestrial radio access network UTRAN 4 is called the Iu interface, and the interface between the UMTS terrestrial radio access network UTRAN 4 and the user equipment UE 6 is called the Uu interface.

The core network CN 2 of FIG. 2 is composed of a Home Location Register HLR 10, a Mobile Services Switching Centre/Visitor Location Register MSC/VLR12, a Gateway MSC GMSC 14, a Serving GPRS (General Packet Radio Service) Support Node SGSN 28 and a Gateway GPRS Support Node GGSN 18.

The UTRAN 4 is composed of radio network subsystems RNS 20 and 22. It should be appreciated that more or less than two RNSs my be employed by a UTRAN. The interface between two radio network subsystems RNSs is called the Iur interface. The radio network subsystems RNS 20 and 22 are composed of a radio network controller RNC 24 and one or more node Bs 26. As explained above, the RNC of the UTRAN logically corresponds to the BSC 34 of the GSM (global system for mobile communications) standard. The interface between the radio network controller RNC 24 and node B 26 is called the Iub interface.

The Radio Network Controller RNC 24 is the network element responsible for the control of the radio resources of UTRAN 4. The RNC 24 interfaces the core network CN 2 (normally to one MSC 12 and one SGSN 28) and also terminates the Radio Resource Control RRC protocol that defines the messages and procedures between the user equipment UE 6 and UTRAN 4. The RNC 24 logically corresponds to the base station controller BSC 34 of the GSM standard. In FIG. 2 each radio network controller RNC of the radio access network 4 may be connected to two CN nodes (MSC/VLR and SGSN). However, it should be appreciated that in some network topologies it may be possible that one RNC is connected only to one CN node or to more than two CN nodes.

The main function of the Node B 26 is to perform the air interface L1 (Layer 1) processing (channel coding and interleaving, rate adaptation, spreading, etc). It also performs some basic Radio Resource Management operation such as the inner loop power control. It logically corresponds to the Base Transceiver Station BTS of the GSM standard.

The dual-mode mobile station may consist of the Mobile Equipment ME 36, GSM Subscriber Identity Module GSIM 37 and the UMTS Subscriber Identity Module USIM 38. The mobile equipment ME 36 is the radio terminal used for radio communication over the Uu interface between the user equipment UE 6 and the UTRAN 4 and over the interface between UE and the BTS 30. The GSIM 37 and the USIM 38 is typically a smart card that holds the subscriber identity, performs authentication algorithms, and stores authentication and encryption keys and some subscription information that is needed at the terminal. These GSIM and USIM function may me implemented by one or two cards, depending on the application.

In the GSM multiple traffic channels TCHs can be combined to form a high speed data bearer. This is indicated for the network nodes by appropriate parameters (e.g. by a parameter indicating the maximum number of traffic channels) in a Bearer Capability Information Element BCIE. However, these parameters are not needed in the UMTS call set-up, but the UTRAN function provides data bearers that may be of any size. The UMTS supports only a part of the fields of the BCIE. Although the multislot parameters are not needed at the setup of the original UMTS-call between the mobile station 6 and the UMTS MSC 16, they are needed to be able to set-up the connection between the mobile station and the target GSM MSC 12.

The following describes a procedure enabling handover from the MSC 16 of the packet switched UMTS to the MSC 12 of the circuit switched GSM. In the embodiment the GSM side bearer is set-up at a UMTS to GSM handover based on employment of a default set of parameters. The mobile station MS is allowed to modify these parameters after handover. These default parameters may be obtained based on mapping from the UMTS side bearer quality of service (QoS). The default set of parameters specifies e.g. the number of traffic channels which can be calculated from UMTS bitrate. That is, the missing values of the BCIE fields are determined by an appropriate network element. The default parameters may be defined beforehand e.g. by the network operator.

The handover is procedures may be based on a default set of parameters e.g. such that the current bearer attributes are mapped into 'sufficient', values. For example, a 28, 8 kbps data bearer in the packet switched network will require three 9.6 kbps traffic channels in the switched network side, and thus maximum_number_traffic_channels parameter is given a value of 3. That is, in the GSM network three traffic channels are required in order to be able to continue the communication.

The determination of the appropriate default values for the parameters may be accomplished by the target MSC 12. It should be appreciated that the determination may also be accomplished by the source MSC 16 i.e. the previous controller or any other appropriate controller element of the communication system.

Figure 3:
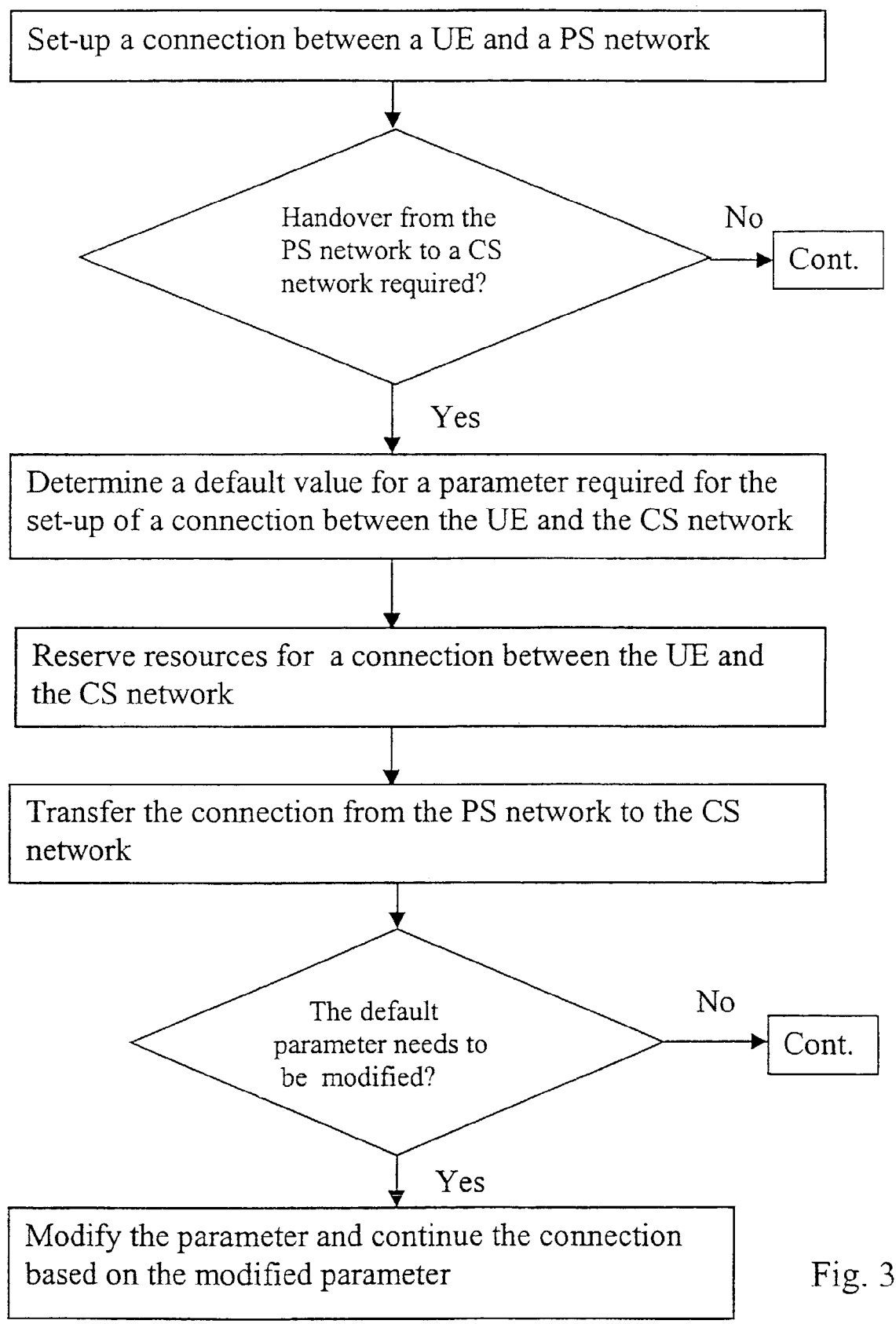
FIG. 3 is a flowchart illustrating the operation of one embodiment of the present invention.

As is shown by FIG. 3, a communication path is established between the target MSC 12 and the mobile station 6 after initiation of the handover procedure. Necessary radio resources may be reserved for the connection based on the default parameters that may be based information obtained through the mapping. The actual handover is preferably accomplished only after the required resources are reserved for the communication path between the mobile station and the target MSC 12 via the BSC 34, BTS 12 and wireless interface between the BTS 12 and the mobile station 6. That is, the connection between the mobile station 6 and the MSC 12 is negotiated based on default values before the actual handover procedure.

The target GSM MSC may initiate a MODIFY procedure, if this is required to negotiate the assumed multislot parameters with the mobile station. The MODIFY procedure is a feature of the GSM that is used for a new purpose in this embodiment. In other words, the target MSC may send a MODIFY-message which contains a BCIE with the default multislot parameters. This may be done after the actual handover procedure, i.e. when the time factor is not as critical as it is during the handover. However, the modify procedure may also be accomplished in during the set-up of the connection between the mobile station and the target MSC.

The mobile station MS may accept the new parameters by responding with a MODIFY_COMPLETE-message with the proposed parameters. In case the mobile station will accept the connection but not the proposed parameters, it may respond with altered parameters. The mobile station MS may also reject the connection and the proposed parameters by MODIFY_REJECT in which case the call will be disconnected.

It should be appreciated that whilst embodiments of the present invention have been described in relation to mobile stations, embodiments of the present invention are applicable to any other suitable type of user equipment.

The data is described as being in packet form. In alternative embodiments of the invention the data may be sent in any suitable format.

It should be appreciated that the GSM MSC node and the UMTS MSC node may be implemented within one entity or network node.

The embodiment of the invention has discussed handover of a connection between user equipment and a network controller. Embodiments of the present invention may also be applicable to a handover between other network elements where applicable.

The embodiments may make it unnecessary for the dual mode (GSM-UMTS) mobile station to generate and send any GSM-specific parameters at every UMTS-call setup, and therefore it is possible to avoid a procedure that may be unnecessary for the most of the UMTS calls. The embodiments also meet the tight timing requirements of the handover.

It is also noted herein that while the above describes exemplifying embodiments of the invention, there are several variations and modifications which may be made to the disclosed solution without departing from the scope of the present invention as defined in the appended claims.

The invention claimed is:

1. A method:
   establishing a connection between a mobile station, wherein the mobile station is configured to be served by a second node and a third node that respectively belong to a first communication system and a second communication system with different rules of communication, and the second node based on predefined parameters;
   initiating handover procedure of the connection from the first communication system to the second communication system so that the connection may continue between the mobile station and the third node;
   using a default value for at least one connection parameter required to establish the connection between the mobile station and the third node during the handover procedures, the default value being based on a quality of service parameter of the connection between the mobile station and the second node; and modifying, when determined necessary, the value of said at least one parameter.

2. The method as claimed in claim 1, further comprising:
   configuring the connection to be handed over to be a data connection.

3. The method as claimed in claim 2, further comprising:
   configuring the data connection to be a high speed data connection.

4. The method as claimed in claim 1, further comprising:
   configuring the second node to be a controller of a packet switched communication network.

5. The method as claimed in claim 4, further comprising:
   configuring the controller to be a radio access network controller.

6. The method as claimed in claim 1, further comprising:
   configuring the third node to be a controller of a circuit switched communication network.

7. The method as claimed in claim 6, further comprising:
   configuring the controller of the circuit switched communication network to be a mobile switching center.

8. The method as claimed in claim 1, further comprising:
   configuring said default value of the parameter to comprises a parameter indicating the number of traffic channels for a circuit switched connection.

9. The method as claimed in claim 8, further comprising:
   determining said default value for the parameter indicating the number of traffic channels based on the bitrate of a packet switched connection between the mobile station and the second node.

10. The method as claimed in claim 1, further comprising:
    determining the default value of the parameter by mapping at least one of the bearer characteristics of the connection between the mobile station and the second node in characteristic of the connection between the mobile station and the third node.

11. The method as claimed in claim 1, wherein the modifying comprises
    transmitting modify request from the third node to the mobile station, the request containing bearer capability information and said at least one default parameter,
    determining whether the proposed default parameters are acceptable by the mobile station, and
    transmitting a response from the mobile station to the third node indicating the result of the determination.

12. The method as claimed in claim 11, further comprising:
    configuring the response to comprises one of the following information:
    modification completed acknowledgment together with said at least one default parameter,
    modification completed acknowledgment together with at least one parameter that is modified from the default parameter, or
    modification rejected announcement.

13. A cellular communication system, comprising:
    a mobile station;
    a second node;
    a third node, wherein the second and third nodes are configured to operate based on different rules of communication, wherein the mobile station is configured to communicate with the second node and the third node, wherein a connection between the mobile station and the second node is configured to be handed over to a connection between the mobile station and the third node, and wherein the set-up of a connection between the mobile station and the third node is configured to be based on at least one parameter that is different from the parameters required for the set-up of the connection between the mobile station and the second node;
    a controller configured to determine a default value for said at least one different parameter based on a quality of service parameter of the connection between the mobile station and the second node, wherein the at least one different parameter is configured to be used for setting up the connection between the mobile station and third node during the handover procedures; and
    a modification unit configured to modify the value of said at least one parameter.

14. The communication system as claimed in claim 13, wherein the connection to be handed over is a data connection.

15. The communication system as claimed in claim 14, wherein the data connection is a high speed data connection.

16. The communication system as claimed in claim 13, wherein the second node is a controller of a packet switched communication network.

17. The communication system as claimed in claim 16, wherein the controller is a radio access network controller.

18. The communication system as claimed in claim 13, wherein the third node is a controller of a circuit switched communication network.

19. The communication system as claimed in claim 18, wherein the controller of the circuit switched communication network is a mobile switching center.

20. The communication system as claimed in claim 13, wherein said parameter comprises a parameter indicating the number of traffic channels for a circuit switched connection.

21. The communication system as claimed in claim 20, wherein the controller is configured to determine said parameter indicating the number of traffic channels based on the bitrate of a packet switched connection between the mobile station and the second node.

22. The communication system as claimed in claim 13, wherein the controller is configured to determine the default parameter by mapping at least one of bearer characteristics of the connection between the mobile station and the second node in characteristic of the connection between the mobile station and the third node.

23. The communication system as claimed in claim 13, wherein the third node is configured to generate and transmit a modify request to the mobile station, the request containing bearer capability information and said at least one default parameter, and the mobile station is configured to determine whether the proposed default parameters are acceptable and to generate and transmit a response to the third node indicating the result of the determination.

24. The communication system as claimed in claim 23, wherein the response comprises one of the following information:
   modification completed acknowledgment together with said at least one default parameter,
   modification completed acknowledgment together with at least one parameter that is modified from the default parameter, or
   modification rejected announcement.

25. A cellular communication system controller, configured to:
   determine a default value for a connection parameter required to establish a connection between a mobile station and a third node during a handover procedure of the connection from a connection between the mobile station and a second node,
   wherein the second and third nodes are configured to operate based on different rules of communication, and
   wherein the default value is based on a quality of service parameter of the connection between the mobile station and the second node.

26. A method, comprising:
   handing over a mobile node from a first communication system of a first type to a second communication system of a second type;
   providing a connection between the mobile node and the first communication system, wherein the first communication system requires a first group of parameters for connection;
   initiating handover from the first communication system to the second communication, wherein the second communication system requires a second group of parameters for connection, and wherein the second group of parameters comprises at least one parameter that is not included in the first group of parameters;
   using, for the at least one parameter that is not included in the first group of parameters, a default value based on the handing over being from the first type of communication system, and
   modifying the default value, when necessary.

27. The method of claim 26, further comprising:
   configuring the parameter that is not included in the first group of parameters to be a number of traffic channels.

28. The method of claim 26, wherein modifying the default value, when necessary, comprises
   notifying the mobile node of the default parameters,
   when the mobile node replies with a request to change of parameters, granting the request, and
   when the mobile node does not reply, concluding that modifying is not necessary.

29. A cellular communication system, comprising:
   mobile station means for communicating;
   second node means for operating based on a second rule of communication;
   third node means for operating based on a third rule of communication, wherein the second and third node means are configured to operate based on different rules of communication, wherein the mobile station means is configured to communicate with the second node means and the third node means, wherein a connection between the mobile station means and the second node means is configured to be handed over to a connection between the mobile station means and the third node means, and wherein the set-up of a connection between the mobile station means and the third node means is configured to be based on at least one parameter that is different from the parameters required for the set-up of the connection between the mobile station means and the second node means;
   controller means for determining a default value for said at least one different parameter based on a quality of service parameter of the connection between the mobile station means and the second node means to be used for setting up the connection between the mobile station means and third node means during the handover procedures; and
   modification means for modifying the value of said at least one parameter.

* * * * *